(12) United States Patent
Yokoyama et al.

(10) Patent No.: US 11,060,561 B2
(45) Date of Patent: Jul. 13, 2021

(54) OIL BATH TYPE BEARING DEVICE AND ROTARY MACHINE

(71) Applicant: MITSUBISHI HEAVY INDUSTRIES, LTD., Tokyo (JP)

(72) Inventors: Shimpei Yokoyama, Tokyo (JP); Chihiro Yoshimine, Tokyo (JP); Takuzo Shigihara, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/775,460

(22) Filed: Jan. 29, 2020

(65) Prior Publication Data
US 2020/0263735 A1 Aug. 20, 2020

(30) Foreign Application Priority Data
Feb. 20, 2019 (JP) .............................. JP2019-028412

(51) Int. Cl.
*F16C 17/03* (2006.01)
*F16C 17/06* (2006.01)
(Continued)

(52) U.S. Cl.
CPC ........ *F16C 33/6674* (2013.01); *F01D 25/162* (2013.01); *F04D 29/056* (2013.01);
(Continued)

(58) Field of Classification Search
CPC ........ F16C 17/03; F16C 17/06; F16C 33/108; F16C 33/1045; F16C 33/1085;
(Continued)

(56) References Cited

U.S. PATENT DOCUMENTS

| 4,381,128 A | * | 4/1983 | Vohr | ...................... F16C 17/03 384/154 |
| 5,288,153 A | * | 2/1994 | Gardner | .................. F16C 17/03 384/117 |

(Continued)

FOREIGN PATENT DOCUMENTS

| CN | 105697537 B | * | 3/2018 | ............ F16C 33/108 |
| JP | 2011179548 A | * | 9/2011 | |

(Continued)

*Primary Examiner* — Marcus Charles
(74) *Attorney, Agent, or Firm* — Wenderoth, Lind & Ponack, L.L.P.

(57) ABSTRACT

An oil bath type bearing device which supports a rotating shaft rotating around an axis the bearing device is provided. The oil bath type bearing device includes a plurality of bearing pads which are arranged at intervals in a circumferential direction along an outer peripheral surface of the rotating shaft, an annular carrier ring which supports the plurality of bearing pads from an outer peripheral side and in which an oil supply hole through which a lubricant is supplied is formed, and a casing which covers the carrier ring from the outer peripheral side and holds the lubricant between the rotating shaft and the casing. The oil supply hole penetrate the carrier ring from the outer peripheral side to an inner peripheral side and extends toward a rear side in a rotational direction of the rotating shaft as the oil supply hole goes radially inward with respect to the axis.

6 Claims, 5 Drawing Sheets

(51) Int. Cl.
  *F16C 33/10* (2006.01)
  *F16C 33/66* (2006.01)
  *F01D 25/16* (2006.01)
  *F04D 29/05* (2006.01)
  *F04D 29/056* (2006.01)

(52) U.S. Cl.
  CPC .............. *F16C 17/03* (2013.01); *F16C 17/06* (2013.01); *F16C 33/1045* (2013.01); *F16C 33/1085* (2013.01); *F16C 33/6666* (2013.01)

(58) Field of Classification Search
  CPC .............. F16C 33/6675; F16C 33/6666; F16C 2360/23; F16C 33/6674; F04D 29/056; F01D 25/162; F01D 25/166
  USPC ................. 384/306–309, 311–312, 316, 462
  See application file for complete search history.

(56) References Cited

U.S. PATENT DOCUMENTS

| | | | | |
|---|---|---|---|---|
| 9,169,866 | B2 * | 10/2015 | Sato | ...................... F16C 17/045 |
| 9,618,048 | B2 * | 4/2017 | Nicholas | ................. F16C 17/03 |
| 2010/0111681 | A1 * | 5/2010 | Nakano | ................... F16C 27/02 |
| | | | | 415/180 |
| 2016/0169274 | A1 | 6/2016 | Sato et al. | |

FOREIGN PATENT DOCUMENTS

| | | | | |
|---|---|---|---|---|
| JP | 2012255688 A | * | 12/2012 | |
| JP | 2014145453 A | * | 8/2014 | .......... F16C 33/1045 |
| JP | 2016-109268 | | 6/2016 | |
| JP | 2016109269 A | * | 6/2016 | ............. F16C 17/03 |
| JP | 6101135 | | 3/2017 | |
| JP | 2017082690 A | * | 5/2017 | ............. F16C 17/04 |
| JP | 2017096301 A | * | 6/2017 | ............. F01D 25/16 |
| JP | 2017145935 A | * | 8/2017 | |
| RU | 2293226 C2 | * | 2/2007 | ......... F16C 32/0442 |
| WO | WO-2012114445 A1 | * | 8/2012 | ............... F16C 17/03 |
| WO | WO-2016084937 A1 | * | 6/2016 | ............. F16C 33/1065 |
| WO | WO-2017086153 A1 | * | 5/2017 | ............. F16C 17/03 |
| WO | WO-2017135082 A1 | * | 8/2017 | ........... F04D 29/056 |
| WO | WO-2018029836 A1 | * | 2/2018 | ......... F16C 33/1045 |
| WO | WO-2019142383 A1 | * | 7/2019 | ............. F16C 17/03 |
| WO | WO-2019163162 A1 | * | 8/2019 | ............. F16C 17/03 |

* cited by examiner

OIL BATH TYPE BEARING DEVICE AND ROTARY MACHINE

BACKGROUND OF THE INVENTION

Field of the Invention

The present invention relates to an oil bath type bearing device and a rotary machine.

Priority is claimed on Japanese Patent Application No. 2019-028412, filed on Feb. 20, 2019, the content of which is incorporated herein by reference.

Description of Related Art

In a rotary machine having a rotating shaft which rotates at a high speed, such as a compressor and a turbine, various bearing devices are provided to support a load while smoothly rotating the rotating shaft. As an example of the bearing device, there is a tilting pad bearing. The tilting pad bearing has a plurality of bearing pads which is provided along an outer peripheral surface of the rotating shaft, and a carrier ring which covers the bearing pads from an outer peripheral side.

Each bearing pad is oscillatably supported by a pointed pivot on an inner peripheral surface of the carrier ring (for example, refer to Japanese Unexamined Patent Application, First Publication No. 2016-109268). In a bearing device according to Japanese Unexamined Patent Application, First Publication No. 2016-109268, a nozzle for supplying a lubricant is provided between bearing pads adjacent in a circumferential direction. Thereby, a film of the lubricant is formed between the bearing pad and the rotating shaft, and thus, a smooth rotation of the rotating shaft can be realized.

Meanwhile, a bearing device referred to as an oil bath type bearing device is also widely used as another bearing device different from the tilting pad bearing. In this type of bearing device, a space between a casing and a rotating shaft is filled with a lubricant. That is, the bearing pad is always immersed in the lubricant. The lubricant is supplied from an oil supply hole formed in a carrier ring into the casing through a space between the bearing pads. Thereafter, the lubricant is mixed with the lubricant (mainstream) which flows according to a rotation of the rotating shaft. By mixing the new lubricant, it is possible to decrease a temperature of the lubricant reaching a high temperature while flowing between the bearing pad and the rotating shaft.

SUMMARY OF THE INVENTION

Here, in the oil bath type bearing device, the mainstream of the lubricant flowing according to the rotation of the rotating shaft has a speed higher than that of the flow of the new lubricant supplied from the oil supply hole. Accordingly, the newly supplied lubricant is blown off to the mainstream, and thus, both may not be sufficiently mixed. As a result, the temperature of the lubricant increases, which may affect a load capacity of the bearing device.

The present invention is made to solve the above-described problems, and an object thereof is to provide an oil bath type bearing device and a rotary machine which more stably supply a lubricant to improve a load capacity.

According to a first aspect of the present invention, there is provided an oil bath type bearing device which supports a rotating shaft rotating around an axis, the bearing device including: a plurality of bearing pads which are arranged at intervals in a circumferential direction along an outer peripheral surface of the rotating shaft; an annular carrier ring which supports the plurality of bearing pads from an outer peripheral side and in which an oil supply hole through which a lubricant is supplied is formed; and a casing which covers the carrier ring from the outer peripheral side and holds the lubricant between the rotating shaft and the casing, in which the oil supply hole penetrate the carrier ring from the outer peripheral side to an inner peripheral side and extends toward a rear side in a rotational direction of the rotating shaft as the oil supply hole goes radially inward with respect to the axis.

According to the configuration, the oil supply hole extends toward the rear side in the rotational direction of the rotating shaft as the oil supply hole goes radially inward. Therefore, a flow of a new lubricant supplied through the oil supply hole faces a flow direction (that is, a front side in the rotational direction) of the lubricant which flows along the outer peripheral surface of the rotating shaft. Thus, when the new lubricant and the existing lubricant collide with each other, a vortex about an axial direction is formed in a space between the bearing pads. The new lubricant and the existing lubricant can be sufficiently mixed with each other by forming the vortex.

According to a second aspect of the present invention, in the oil bath type bearing device according to the first aspect, the oil bath type bearing device may further include a throttle portion which is provided in an outlet-side end portion of the oil supply hole and has a flow path cross-sectional area smaller than those of other portions.

According to the configuration, the throttle portion is provided in the outlet-side end portion of the oil supply hole. Therefore, a flow rate of the lubricant passing through the throttle portion can further increase. Accordingly, the lubricant newly supplied through the oil supply hole and the existing lubricant flowing along the outer peripheral surface of the rotating shaft can be more effectively mixed with each other.

According to a third aspect of the present invention, in the oil bath type bearing device according to the first or second aspect, an end surface of the bearing pad on a front side in the rotational direction may extend toward the rear side in the rotational direction as the end surface goes radially inward.

According to the configuration, the end surface of the bearing pad on the front side in the rotational direction extends toward the rear side in the rotational direction as the end surface goes radially inward. Accordingly, the new lubricant supplied through the oil supply hole more acutely collides with the flow of the lubricant flowing along the outer peripheral surface of the rotating shaft toward the outer peripheral surface of the rotating shaft along the end surface. Accordingly, a formation of the vortex is promoted, and the new lubricant and the existing lubricant can be more efficiently mixed with each other.

According to a fourth aspect of the present invention, in the oil bath type bearing device according to any one of the first to third aspects, an end surface of the bearing pad on the rear side in the rotational direction may extend toward the rear side in the rotational direction as the end surface goes radially inward.

According to the configuration, the end surface of the bearing pad on the rear side in the rotational direction extends toward the rear side in the rotational direction as the end surface goes radially inward. Accordingly, the new lubricant supplied through the oil supply hole more acutely collides with the flow of the lubricant flowing along the outer peripheral surface of the rotating shaft toward the outer peripheral surface of the rotating shaft along the end surface. Accordingly, the formation of the vortex is promoted, and the new lubricant and the existing lubricant can be more efficiently mixed with each other.

According to a fifth aspect of the present invention, in the oil bath type bearing device according to any one of the first to fourth aspects, a plurality of the oil supply holes are formed at intervals in an axial direction.

According to the configuration, the plurality of oil supply holes are formed at intervals in the axis direction. Therefore, the lubricant can be stably supplied over the entire area in the axial direction.

According to a sixth aspect of the present invention, in the oil bath type bearing device according to the fifth aspect, opening diameters of the plurality of oil supply holes may increase toward a center in the axial direction.

Here, a pressure caused by the load of the rotating shaft increases as it approaches the center of the bearing pad in the axial direction, and thus, a flow rate of the lubricant increases. According to the configuration, the opening diameters of the plurality of oil supply holes increase toward the center in the axial direction. Therefore, more lubricant can be supplied from the oil supply hole located at the center. As a result, the rotating shaft can be supported more stably.

According to a seventh aspect of the present invention, in the oil bath type bearing device according to any one of the first to sixth aspects, end surfaces facing each other in the circumferential direction in a pair of the bearing pads adjacent to each other may be curved surfaces which are recessed in a direction away from each other.

According to the configuration, the end surfaces of the bearing pads adjacent to each other are curved surfaces which are recessed in the direction away from each other. Thereby, the lubricant flows along the curved surface to more smoothly form the vortex. As a result, the new lubricant supplied through the oil supply hole and the lubricant flowing along the outer peripheral surface of the rotating shaft can be more efficiently mixed with each other.

According to an eighth aspect of the present invention, there is provided a rotary machine including: the rotating shaft; and the oil bath type bearing device according to any one of the first to seventh aspects which rotatably supports the rotating shaft.

According to the configuration, it is possible to provide the rotary machine which can be more stably operated.

According to the present invention, it is possible to provide the oil bath type bearing device and the rotary machine which more stably supply the lubricant to improve the load capacity.

DETAILED DESCRIPTION OF THE INVENTION

First Embodiment

Figure 1:
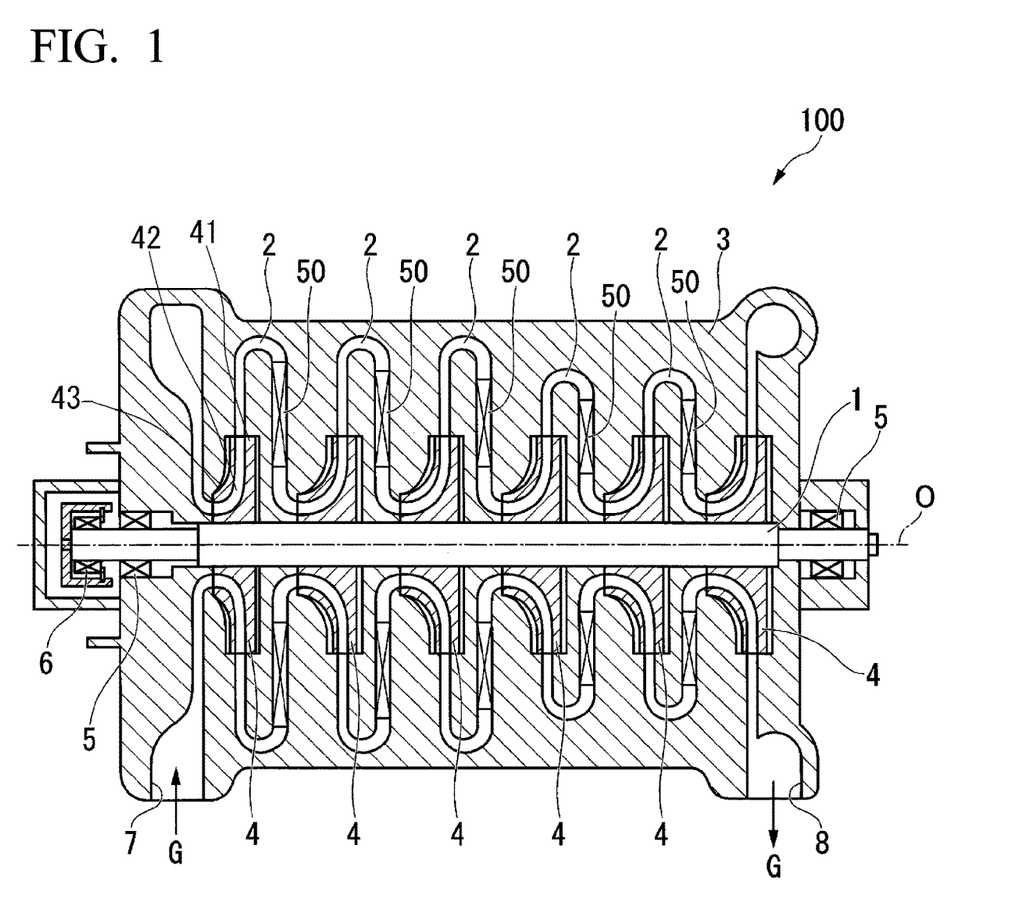
FIG. 1 is a cross-sectional view showing a configuration of a rotary machine according to a first embodiment of the present invention.
Figure 2:
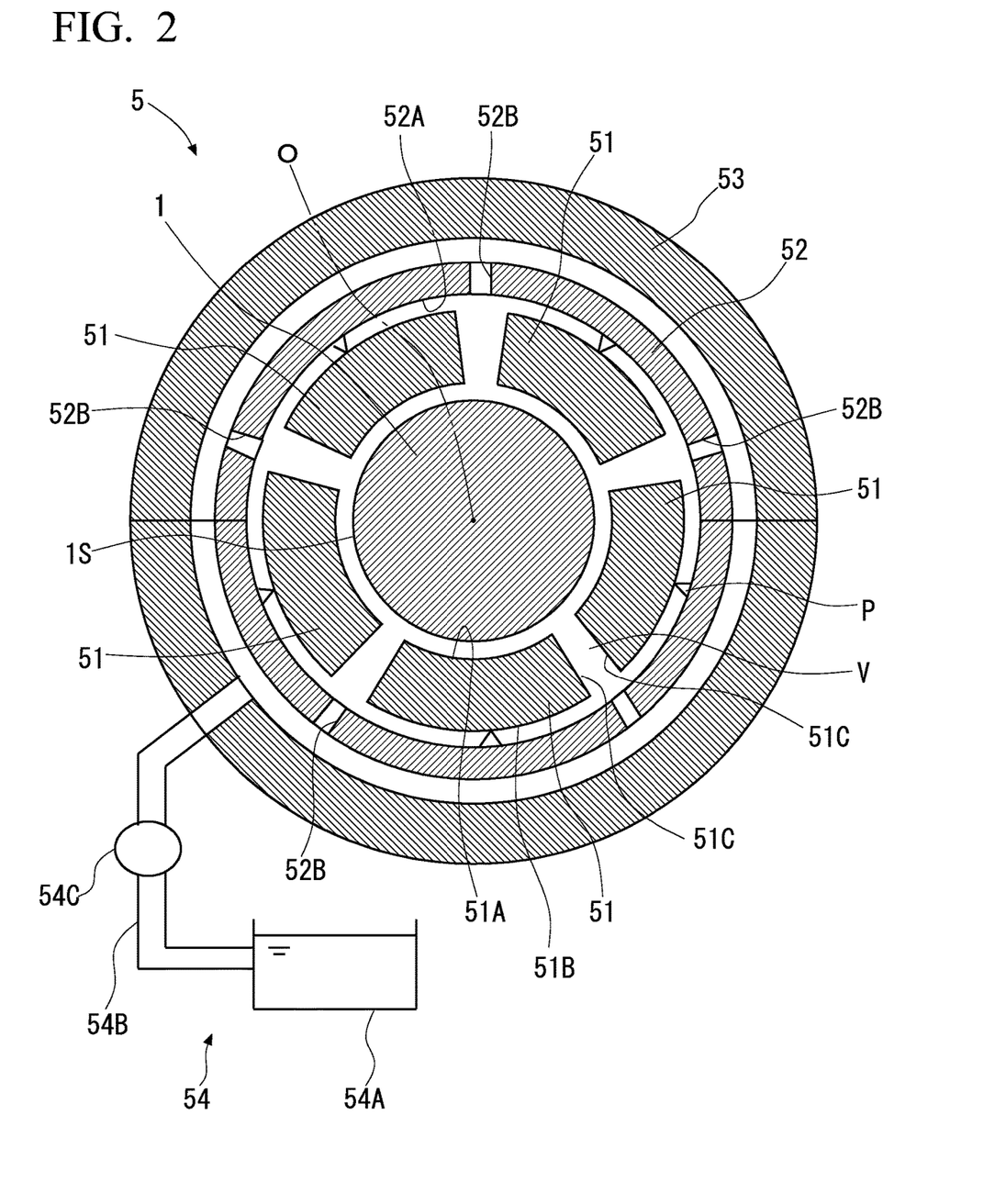
FIG. 2 is a cross-sectional view showing a configuration of a bearing device according to the first embodiment of the present invention.

A first embodiment of the present invention will be described with reference to FIGS. 1 to 3. As shown in FIG. 1, a centrifugal compressor 100 which is a rotary machine according to the present embodiment includes a rotating shaft 1 which rotates around an axis, a casing 3 which covers a periphery of the rotating shaft 1 to form a flow path 2, a plurality of impellers 4 which are provided on the rotating shaft 1, and journal bearings 5 (oil bath type bearing devices).

The casing 3 has a cylindrical shape extending along an axis O. The rotating shaft 1 extends to penetrate an inside of the casing 3 along the axis O. The journal bearing 5 and a thrust bearing 6 are provided in each of both end portions of the casing 3 in an axis O direction. The rotating shaft 1 is rotatably supported around the axis O by the journal bearings 5 and the thrust bearing 6. A configuration of the journal bearing 5 will be described later.

An intake port 7 through which air serving as a working fluid G is taken in from the outside is provided on one side of the casing 3 in the axis O direction. Moreover, an exhaust port 8 through which the working fluid G compressed inside the casing 3 is discharged is provided on the other side of the casing 3 in the axis O direction.

An internal space (flow path 2) which communicates with the intake port 7 and the exhaust port 8 and in which a diameter reduction and a diameter expansion repeat is formed inside the casing 3. Moreover, in the following descriptions, a side in the flow path 2 on which the intake port 7 is located is referred to as an upstream side, and a side in the flow path 2 at which the exhaust port 8 is located is referred to as a downstream side.

The plurality of (six) impellers 4 are provided at intervals on an outer periphery of the rotating shaft 1 in the axis O direction. Each impeller 4 includes a disk 41 which has a substantially circular cross section when viewed in the axis O direction, a plurality of blades 42 which are provided on an upstream surface of the disk 41, and a cover 43 which covers the plurality of blades 42 from the upstream side.

In the present embodiment, one flow path 2 is formed for each impeller 4 (for each compression stage). That is, in the centrifugal compressor 100, five flow paths 2 continuous from the upstream side to the downstream side are formed corresponding to the five impellers 4 excluding the impeller 4 of the last stage. Moreover, a plurality of return vanes 50 for guiding a flow of a fluid are provided in the each flow path 2. The return vanes 50 radially extends about the axis O.

Subsequently, the configuration of the journal bearing 5 will be described with reference to FIGS. 2 and 3. As shown in FIG. 2, the journal bearing 5 has a plurality of (five) bearing pads 51, a carrier ring 52, a bearing casing 53 (casing), and a lubricant supply unit 54.

The plurality of bearing pads 51 are arranged at intervals in a circumferential direction along an outer peripheral surface 1S of the rotating shaft 1. Each bearing pad 51 has an arc shape about the axis O. A surface (sliding surface 51A) of the bearing pad 51 facing the inner peripheral side faces the outer peripheral surface 1S of the rotating shaft 1 with a gap therebetween in a radial direction. The sliding surface 51A has an arc shape about the axis O. Similarly to the sliding surface 51A, a surface (support surface 51B) of the bearing pad 51 facing the outer peripheral side has an arc shape about the axis O.

A space V extending in the circumferential direction is formed between end surfaces (pad end surfaces 51C) of a pair of bearing pads 51 adjacent to each other in the circumferential direction. A lubricant is supplied to the space V via an oil supply hole described later.

The carrier ring 52 is provided on an outer peripheral side of the bearing pad 51. The carrier ring 52 has an annular shape about the axis O. Pivots P which support the bearing pads 51 are provided on an inner peripheral surface (ring inner peripheral surface 52A) of the carrier ring 52. One pivot P is provided for each bearing pad 51. The pivot P is pointed to protrude radially inward from the ring inner peripheral surface 52A. A top of the pivot P is in point contact with the support surface 51B of the bearing pad 51. The bearing pad 51 can oscillate three-dimensionally with the top of the pivot P as a fulcrum.

Moreover, oil supply holes 52B for guiding the lubricant supplied from the lubricant supply unit 54 described later to an inner peripheral side of the carrier ring 52 are formed in the carrier ring 52. Each oil supply hole 52B is a hole which penetrates the carrier ring 52 from the inner peripheral side to the outer peripheral side. The oil supply hole 52B is provided at a position corresponding to the space V in the circumferential direction. That is, in the present embodiment, five oil supply holes 52B are formed. A configuration of the oil supply hole 52B will be described later.

The bearing casing 53 is provided on the outer peripheral side of the carrier ring 52. The bearing casing 53 is provided to cover the bearing pads 51 and the carrier ring 52 from the outer peripheral side and hold the lubricant between the outer peripheral surface 1S of the rotating shaft 1 and the bearing casing 53. That is, the journal bearing 5 according to the present embodiment is an oil bath type bearing device, and a space on an inner peripheral side of the bearing casing 53 is filled with the lubricant.

The lubricant supply unit 54 is connected to the bearing casing 53. The lubricant supply unit 54 includes a tank 54A which stores the lubricant, a supply pipe 54B which connects the tank 54A and the bearing casing 53 to each other, and a pump 54C which is provided on the supply pipe 54B. By driving the pump 54C, the lubricant in the tank 54A is pumped into the bearing casing 53 through the supply pipe 54B.

The lubricant pumped into the bearing casing 53 reaches the space V between the bearing pads 51 via an oil supply hole 52B formed in the carrier ring 52. In this space V, the new lubricant supplied from the oil supply hole 52B is mixed with a flow (mainstream) of the lubricant flowing along the outer peripheral surface 1S of the rotating shaft 1. By mixing the new lubricant, it is possible to reduce a temperature of the lubricant which is heated while flowing between the bearing pads 51 and the rotating shaft 1. However, a speed difference between the mainstream and the flow of the new lubricant increases excessively according to a rotational speed of the rotating shaft 1, and thus, there is a possibility that the mainstream and the new lubricant are not sufficiently mixed. As a result, the temperature of the lubricant increases, which may affect a load capacity of the journal bearing 5.

Figure 3:
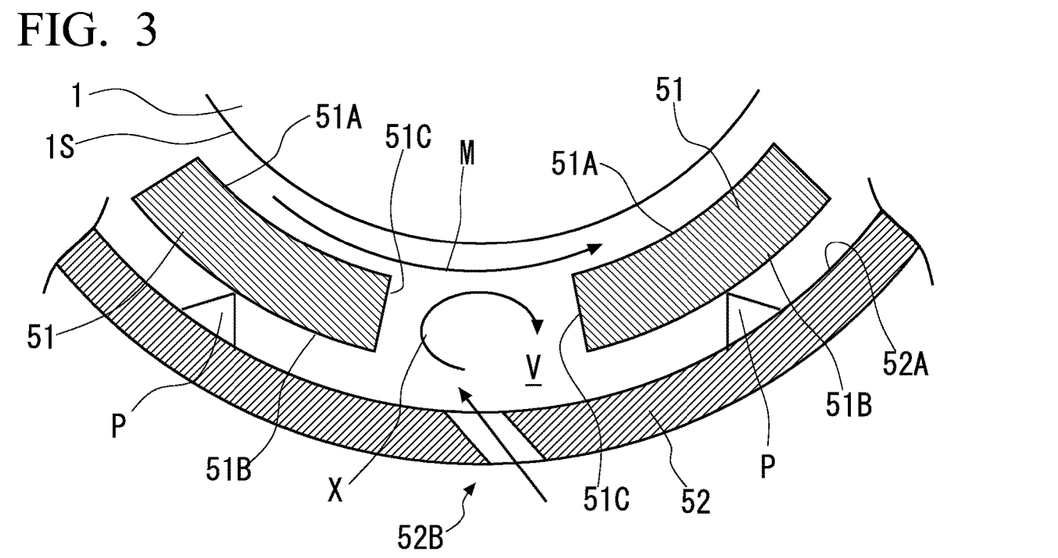
FIG. 3 is an enlarged cross-sectional view of a main portion of the bearing device according to the first embodiment of the present invention.

Therefore, in the present embodiment, the oil supply hole 52B has a configuration as shown in FIG. 3. As shown in FIG. 3, the oil supply hole 52B extends obliquely in the radial direction of the axis O. More specifically, the oil supply hole 52B extends toward a rear side in a rotational direction of the rotating shaft 1 as the oil supply hole 52B goes radially inward with respect to the axis O. Thereby, the lubricant which has flowed into the space V through the oil supply hole 52B collides acutely with the flow (mainstream M) of the lubricant flowing along the outer peripheral surface 1S of the rotating shaft 1. As a result, as shown in FIG. 3, a vortex X of the lubricant is formed in the space V by the mainstream M and the flow of the new lubricant. The mainstream M and the new lubricant are mixed with each other by the vortex X.

As described above, according to the configuration of the present embodiment, the oil supply hole 52B extends toward the rear side in the rotational direction of the rotating shaft 1 as the oil supply hole 52B goes radially inward. Therefore, the flow of the new lubricant supplied through the oil supply hole 52B faces the flow direction (that is, a front side in the rotational direction) of the lubricant which flows along the outer peripheral surface 1S of the rotating shaft 1. Thus, when the new lubricant and the existing lubricant collide with each other, a vortex X about the axis O direction is formed in the space V between the bearing pads 51. The new lubricant and the existing lubricant (mainstream M) can be sufficiently mixed with each other by forming the vortex V. As a result, the temperature of the mainstream M of the lubricant decreases, and thus, the load capacity of the journal bearings 5 can be maintained and improved.

Hereinbefore, the first embodiment of the present invention is described. Moreover, various changes and modifications can be made to the above configuration within a scope which does not depart from the gist of the present invention. For example, in the above embodiment, the example in which five bearing pads 51 are provided is described. However, the number of bearing pads 51 may be four or less or six or more. Furthermore, in the embodiment, the example in which one oil supply hole 52B is formed in each of the spaces V between the bearing pads 51 is described. However, the oil supply hole 52B may be formed in a region corresponding to only a portion of the space V.

Second Embodiment

Figure 4:
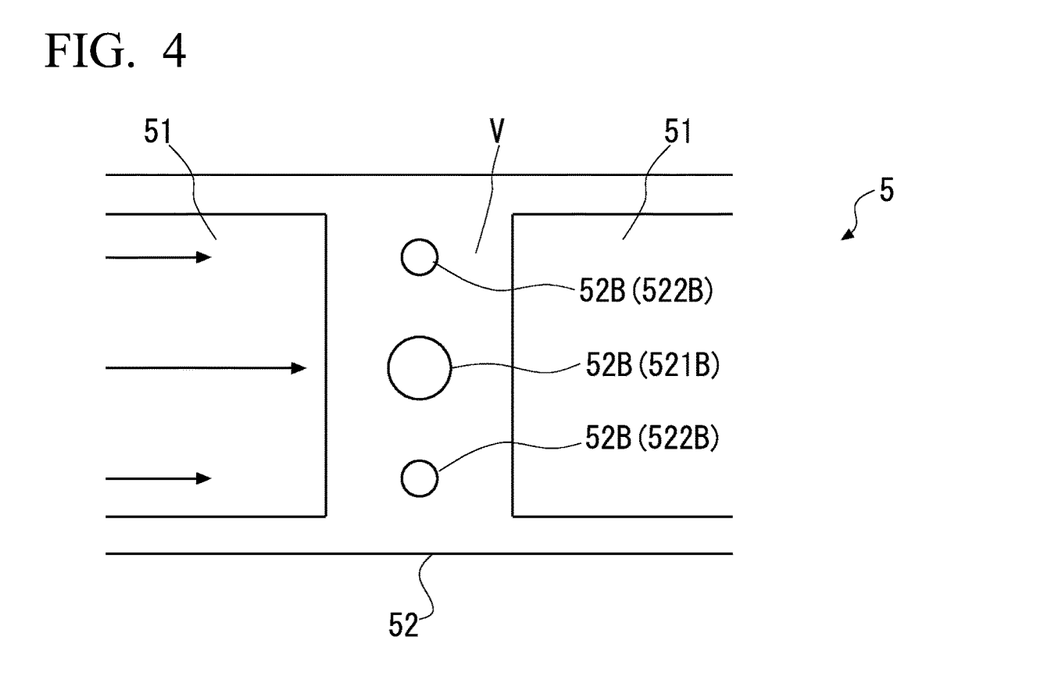
FIG. 4 is a view showing a configuration of an oil supply hole of a bearing device according to a second embodiment of the present invention.

Next, a second embodiment of the present invention will be described with reference to FIG. 4. Moreover, the same reference numerals are assigned to configurations similar to those of the first embodiment, and detail descriptions thereof are omitted. As shown in FIG. 4, in the present embodiment, a plurality of (three) oil supply holes 52B are formed for each space V. The oil supply holes 52B are arranged at intervals in the axis O direction. Further, among the plurality of oil supply holes 52B, a first oil supply hole 521B located at a center in the axis O direction is set to have an opening diameter larger than those of the other oil supply holes 52B (second oil supply holes 522B).

According to the configuration, the plurality of oil supply holes 52B are formed at intervals in the axis O direction. Therefore, the lubricant can be stably supplied to the bearing pads 51 over the entire area in the axis O direction.

Here, a pressure caused by the load of the rotating shaft 1 increases as it approaches the center of the bearing pad 51 in the axis O direction, and thus, a flow rate of the lubricant increases. According to the configuration, the opening diameters of the plurality of oil supply holes 52B increase toward the center in the axis O direction. Therefore, more lubricant can be supplied from the oil supply hole 52B (first oil supply hole 521B) located at the center. As a result, the rotating shaft 1 can be supported more stably.

Hereinbefore, the second embodiment of the present invention is described. Moreover, various changes and modifications can be made to the above configuration within a scope which does not depart from the gist of the present invention. For example, in the second embodiment, the example in which three oil supply holes 52B are formed in the axis O direction is described. However, the number of oil supply holes 52B is not limited to three, and may be four or more.

Third Embodiment

Figure 5:
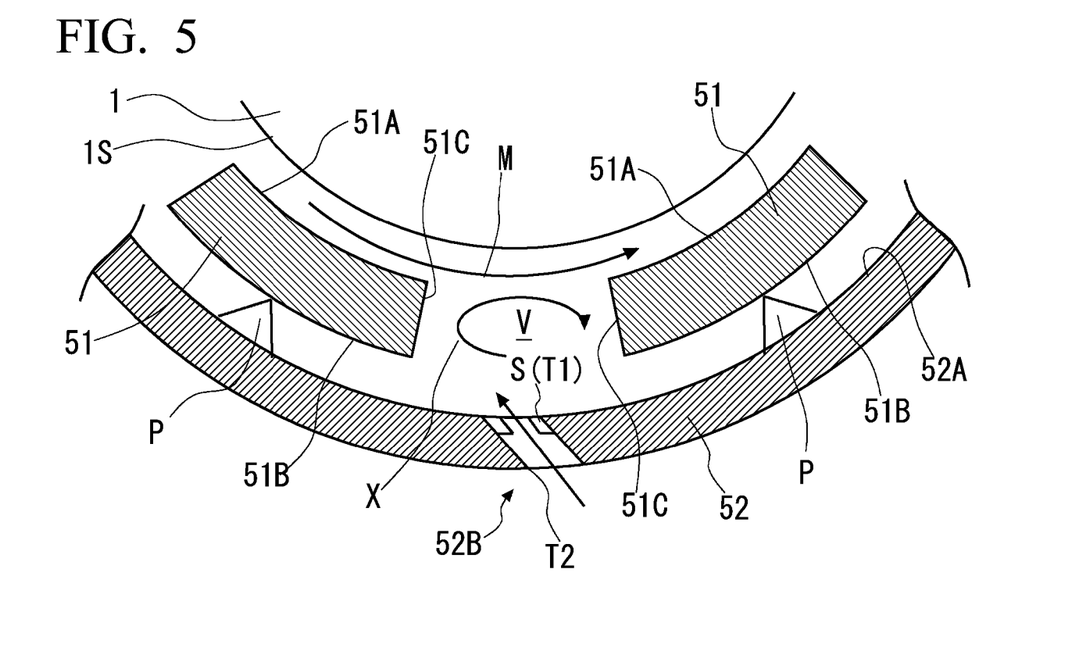
FIG. 5 is an enlarged cross-sectional view of a main portion of a bearing device according to a third embodiment of the present invention.

Subsequently, a third embodiment of the present invention will be described with reference to FIG. 5. Moreover, the same reference numerals are assigned to configurations similar to those of the above-described embodiments, and detail descriptions thereof are omitted. As shown FIG. 5, in the present embodiment, a throttle portion S is provided in an outlet-side end portion T1 of the oil supply hole 52B. In the throttle portion S, a flow path cross-sectional area is smaller than those of other portions in the oil supply hole 52B. That is, an opening diameter of the outlet-side end portion T1 is smaller than an opening diameter of the inlet-side end portion T2.

According to the configuration, the throttle portion S is provided in the outlet-side end portion T1 of the oil supply hole 52B. Therefore, a flow rate of the lubricant passing through the throttle portion S can further increase. Accordingly, a swirling flow velocity of the vortex X formed in the space V further increases, and the lubricant newly supplied through the oil supply hole 52B and the existing lubricant flowing along the outer peripheral surface 1S of the rotating shaft 1 can be more effectively mixed with each other.

Hereinbefore, the third embodiment of the present invention is described. Moreover, various changes and modifications can be made to the above configuration within a scope which does not depart from the gist of the present invention. For example, it is possible to adopt a configuration in which the configuration of the second embodiment and the configuration of the third embodiment are combined with each other.

Fourth Embodiment

Figure 6:
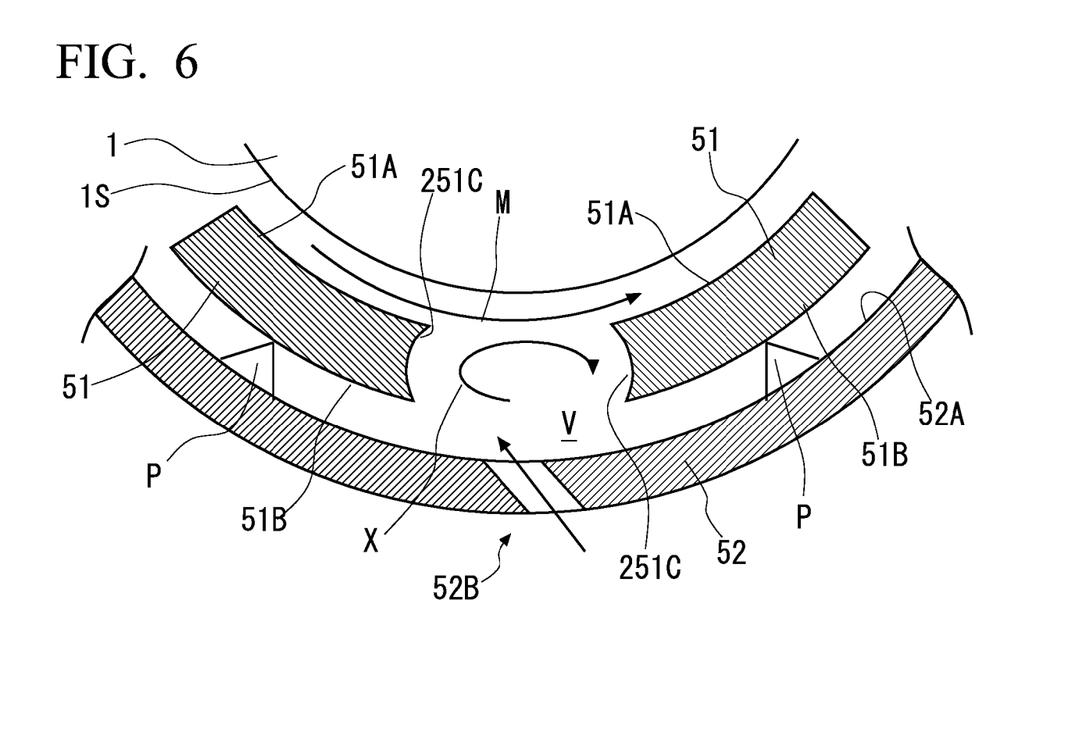
FIG. 6 is an enlarged cross-sectional view of a main portion of a bearing device according to a fourth embodiment of the present invention.

Next, a fourth embodiment of the present invention will be described with reference to FIG. 6. In addition, the same reference numerals are assigned to configurations similar to those of the above-described embodiments, and detail descriptions thereof are omitted. As shown in FIG. 6, in the present embodiment, shapes of end surfaces (pad end surfaces 251C) of the bearing pad 51 in the circumferential direction are different from those of the above-described embodiments. Specifically, each pad end surface 251C is a curved surface which is recessed in the circumferential direction. That is, in the pair of bearing pads 51 adjacent to each other, the respective pad end surfaces 251C are recessed in a curved shape in a direction away from each other.

According to the configuration, the end surfaces (pad end surfaces 251C) of the bearing pads 51 adjacent to each other are curved surfaces which are recessed in the direction away from each other. Thereby, the lubricant flows along the curved surface to more smoothly form the vortex X. As a result, the new lubricant supplied through the oil supply hole 52B and the lubricant flowing along the outer peripheral surface of the rotating shaft can be more efficiently mixed with each other.

Hereinbefore, the fourth embodiment of the present invention is described. Moreover, various changes and modifications can be made to the above configuration within a scope which does not depart from the gist of the present invention. For example, it is possible to adopt a configuration in which the configuration of the fourth embodiment is combined with the configuration of the second embodiment and the configuration of the third embodiment.

Fifth Embodiment

Figure 7:
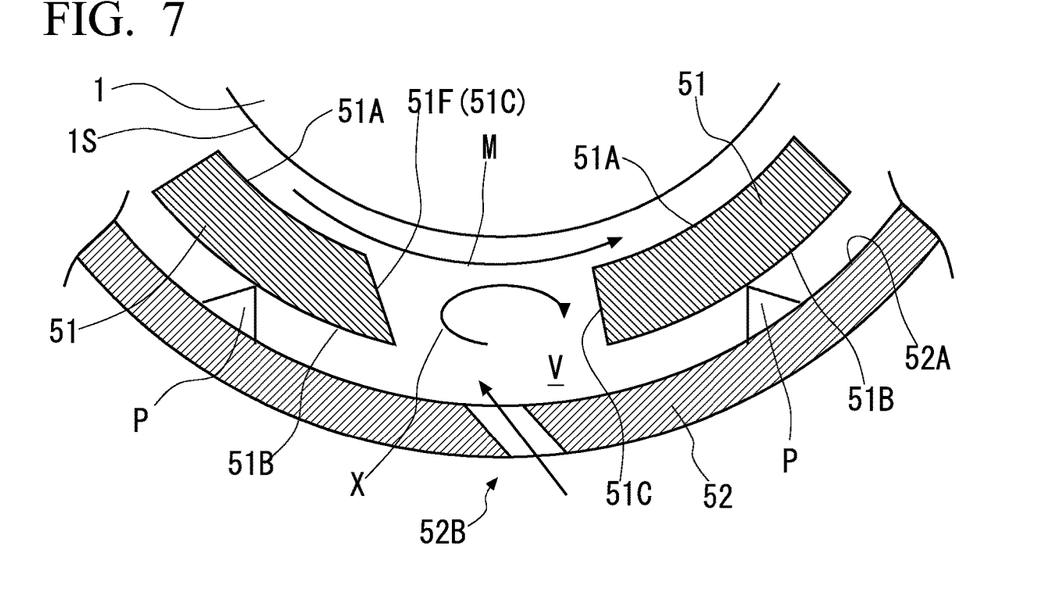
FIG. 7 is an enlarged cross-sectional view of a main portion of a bearing device according to a fifth embodiment of the present invention.

Subsequently, a fifth embodiment of the present invention will be described with reference to FIG. 7. Moreover, the same reference numerals are assigned to configurations similar to those of the above-described embodiments, and detail descriptions thereof are omitted. As shown in FIG. 7, in the present embodiment, in the pad end surfaces 51C of the bearing pad 51, the end surface (front-side end surface 51F) on the front side in the rotational direction extends obliquely with respect to a radial direction of the axis O. That is, the front-side end surface 51F extends toward a rear side in the rotational direction as the front-side end surface 51F goes radially inward.

According to the configuration, the end surface (front-side end surface 51F) of the bearing pad 51 on the front side in the rotational direction extends toward the rear side in the rotational direction as the end surface goes radially inward. Accordingly, the new lubricant supplied through the oil supply hole 52B more acutely collides with the flow of the lubricant flowing along the outer peripheral surface 1S of the rotating shaft 1 toward the outer peripheral surface 1S of the rotating shaft 1 along the front-side end surface 51F. Accordingly, the formation of the vortex X is promoted, and the new lubricant and the existing lubricant can be more efficiently mixed with each other.

Figure 8:
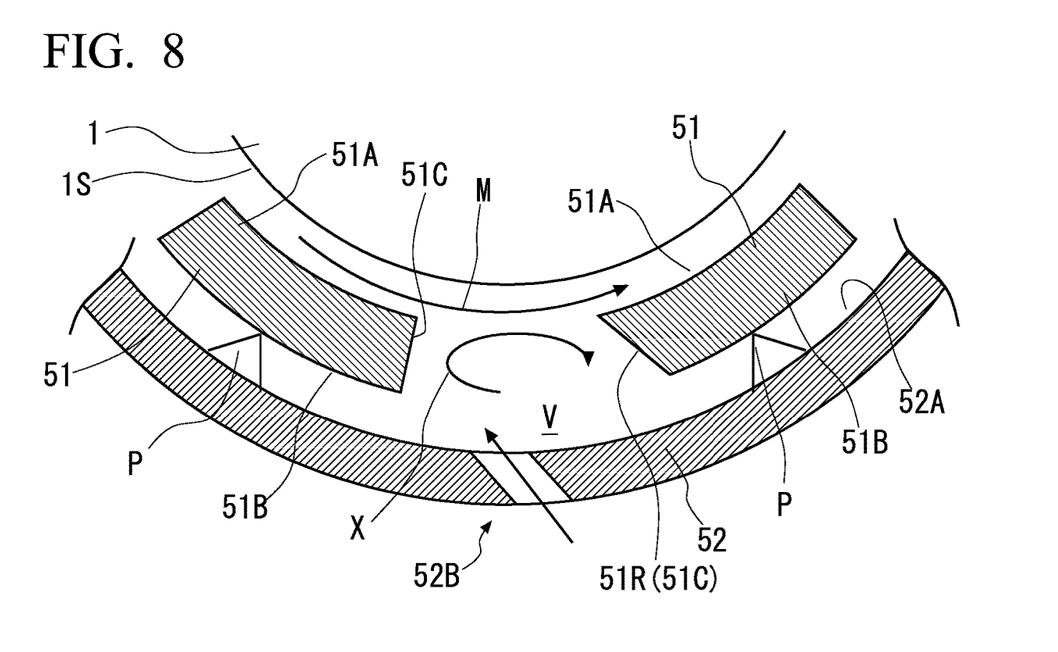
FIG. 8 is an enlarged cross-sectional view of a main portion showing a modified example of the bearing device according to a fifth embodiment of the present invention.

Hereinbefore, the fifth embodiment of the present invention is described. Moreover, various changes and modifications can be made to the above configuration within a scope which does not depart from the gist of the present invention. For example, as shown in FIG. 8, instead of the front-side end surface 51F of the bearing pad 51, it is possible to adopt a configuration in which an end surface (rear-side end surface 51R) on the rear side in the rotational direction extends obliquely with respect to the radial direction. That is, the rear-side end surface 51R extends toward the rear side in the rotational direction as the rear-side end surface 51R goes radially inward. Even with this configuration, the formation of vortex X can be promoted. Furthermore, it is possible to adopt a configuration in which the front-side end surface 51F and the rear-side end surface 51R are combined with each other. Moreover, the configurations of the second embodiment to the fourth embodiment are appropriately selected and combined with the configuration of the fifth embodiment.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: rotating shaft
1S: outer peripheral surface
2: flow path
3: casing
4: impeller
5: journal bearing (oil bath type bearing device)
51: bearing pad
51C, 251C: pad end surface
51F: front-side end surface
51R: rear-side end surface
52: carrier ring
52A: ring inner peripheral surface
52B: oil supply hole
53: bearing casing
521B: first oil supply hole
522B: second oil supply hole
54: lubricant supply unit
54A: tank
54B: supply pipe
54C: pump
6: thrust bearing
7: intake port
8: exhaust port
41: disk
42: blade
43: cover
50: return vane
100: centrifugal compressor
O: axis
S: throttle portion
T1: outlet-side end portion
T2: inlet-side end portion
V: space
X: vortex

What is claimed is:

1. An oil bath type bearing device for supporting a rotating shaft rotating around an axis, the bearing device comprising:
a plurality of bearing pads which are arranged at intervals in a circumferential direction along an outer peripheral surface of the rotating shaft;
an annular carrier ring which supports the plurality of bearing pads from an outer peripheral side and in which a plurality of oil supply holes through which a lubricant is supplied is formed; and
a casing which covers the carrier ring from the outer peripheral side and holds the lubricant between the rotating shaft and the casing,
wherein the oil supply holes penetrate the carrier ring from the outer peripheral side to an inner peripheral side and extends toward a rear side in a rotational direction of the rotating shaft as the oil supply holes go radially inward with respect to the axis,
wherein the oil supply holes are formed at intervals in an axial direction, and
wherein opening diameters of the oil supply holes increase toward a center in the axial direction.

2. The oil bath type bearing device according to claim 1, further comprising:
a throttle portion which is provided in an outlet-side end portion of at least one of the oil supply holes and has a flow path cross-sectional area smaller than those of other portions.

3. The oil bath type bearing device according to claim 1, wherein an end surface of the bearing pad on a front side in the rotational direction extends toward the rear side in the rotational direction as the end surface goes radially inward.

4. The oil bath type bearing device according to claim 1, wherein an end surface of the bearing pad on the rear side in the rotational direction extends toward the rear side in the rotational direction as the end surface goes radially inward.

5. The oil bath type bearing device according to claim 1, wherein end surfaces facing each other in the circumferential direction in a pair of the bearing pads adjacent to each other are curved surfaces which are recessed in a direction away from each other.

6. A rotary machine comprising:
a rotating shaft; and
the oil bath type bearing device according to claim 1 which rotatably supports the rotating shaft.

* * * * *